(12) United States Patent
Fish et al.

(10) Patent No.: US 7,775,047 B2
(45) Date of Patent: Aug. 17, 2010

(54) HEAT SHIELD WITH STRESS RELIEVING FEATURE

(75) Inventors: Jason Fish, Brampton (CA); Bhawan B. Patel, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 999 days.

(21) Appl. No.: 11/534,381

(22) Filed: Sep. 22, 2006

(65) Prior Publication Data

US 2008/0072598 A1 Mar. 27, 2008

(51) Int. Cl.
*F02C 1/00* (2006.01)
*F02G 3/00* (2006.01)

(52) U.S. Cl. .......................................... 60/739

(58) Field of Classification Search ........... 60/733–740, 60/742, 746, 747, 748; 239/533.2
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 3,213,523 A | 10/1965 | Boehler | |
| 3,472,025 A | 10/1969 | Simmons et al | |
| 4,100,733 A | 7/1978 | Striebel et al. | |
| 4,322,945 A | 4/1982 | Peterson et al. | |
| 4,327,547 A | 5/1982 | Hughes et al. | |
| 4,404,806 A | 9/1983 | Bell, III et al. | |
| 4,483,137 A | 11/1984 | Faulkner | |
| 4,499,924 A * | 2/1985 | Garrett | 138/110 |
| 5,036,657 A | 8/1991 | Seto et al. | |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |
| 5,848,525 A | 12/1998 | Spencer | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |

(Continued)

FOREIGN PATENT DOCUMENTS

CA 1013153 7/1977

(Continued)

*Primary Examiner*—Michael Cuff
*Assistant Examiner*—Andrew Nguyen
(74) *Attorney, Agent, or Firm*—Ogilvy Renault LLP

(57) ABSTRACT

A heat shield for a fuel member of a gas turbine engine having at least one heat shield segment having a connection edge with at least one joint receiving portion defined therealong for receiving a welded joint attaching the heat shield segment to a fuel member, each joint receiving portion including a stress relieving feature defined along at least one end thereof.

11 Claims, 5 Drawing Sheets

U.S. PATENT DOCUMENTS

| | | |
|---|---|---|
| 6,256,995 B1 | 7/2001 | Sampath et al. |
| 6,463,739 B1 | 10/2002 | Mueller et al. |
| 6,761,035 B1 | 7/2004 | Mueller |
| 2003/0014979 A1 | 1/2003 | Summerfield et al. |
| 2005/0188699 A1 * | 9/2005 | Shafique et al. ............... 60/739 |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

\* cited by examiner

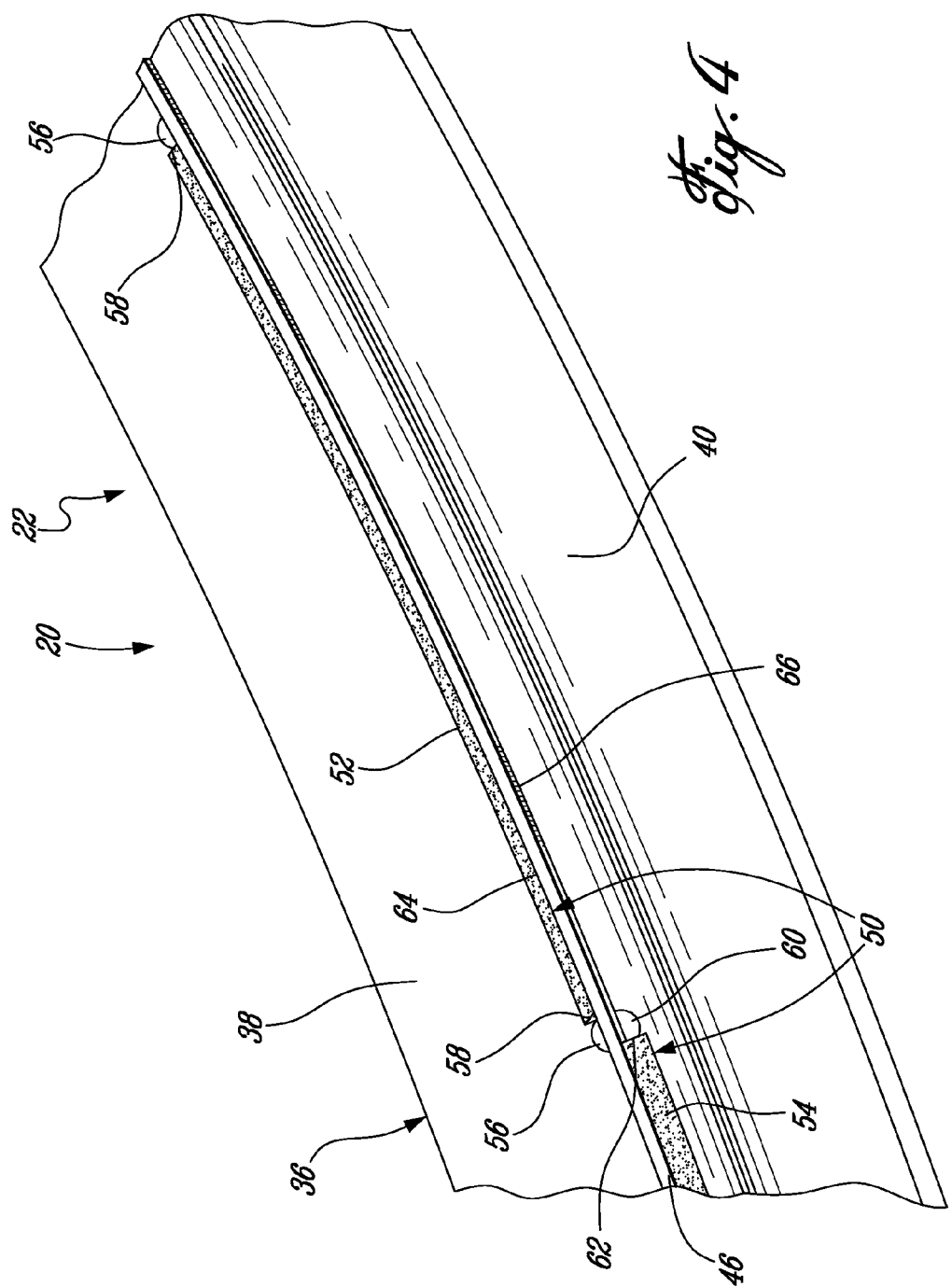

HEAT SHIELD WITH STRESS RELIEVING FEATURE

TECHNICAL FIELD

The invention relates generally to gas turbine engines and, more particularly, to fuel injection systems for such gas turbine engines.

BACKGROUND OF THE ART

In gas turbine engines, fuel carrying members such as internal fuel manifold assemblies are generally located in a substantially hot environment, and as such must protect the fuel being carried therein from the excessive heat of that environment. Heat shields are generally used to reduce the convective heat transfer from the hot environment to the fuel carrying members.

Such heat shields are typically attached to the corresponding fuel carrying member through welded joints. However, the difference in temperature between the heat shield and corresponding fuel carrying member usually causes a substantial thermal expansion difference therebetween, which creates stresses at and/or near the welded joints. These stresses are particularly high at the ends of each of the welded joints, where the discontinuity created by the joint end creates a stress concentration, leading to the formation and propagation of cracks in the heat shield.

Accordingly, improvements are desirable.

SUMMARY OF THE INVENTION

It is therefore an object of this invention to provide an improved fuel injection system.

In one aspect, the present invention provides a fuel injection system for a gas turbine engine, the system comprising a fuel conveying member adapted to circulate fuel therethrough, the fuel conveying member having a joint receiving member, and a heat shield substantially covering the fuel conveying member, the heat shield having at least one connection edge fastened to the joint receiving member by at least one welded joint, and at least one stress relieving feature defined along the connection edge at least one end of the welded joint.

In another aspect, the present invention provides a heat shield for a fuel member of a gas turbine engine, the heat shield comprising at least one heat shield segment having a connection edge with at least one joint receiving portion defined therealong for receiving a welded joint attaching the heat shield segment to a fuel member, each joint receiving portion including a stress relieving feature defined along at least one end thereof.

In a further aspect, the present invention provides a method of manufacturing a fuel injection system, the method comprising forming a fuel conveying member with a joint receiving member included thereon, forming at least one heat shield segment to surround the fuel conveying member, forming at least one stress relieving feature in each heat shield segment along a connection edge thereof, placing each heat shield segment around the fuel conveying member with the connection edge thereof adjacent the joint receiving member, and joining each connection edge to the joint receiving member by forming at least one welded joint with at least one end thereof disposed adjacent a corresponding one of the at least one stress relieving feature.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 4 is a perspective view of part of the internal fuel manifold assembly of FIG. 2.

DETAILED DESCRIPTION OF THE PREFERRED EMBODIMENTS

Figure 1:
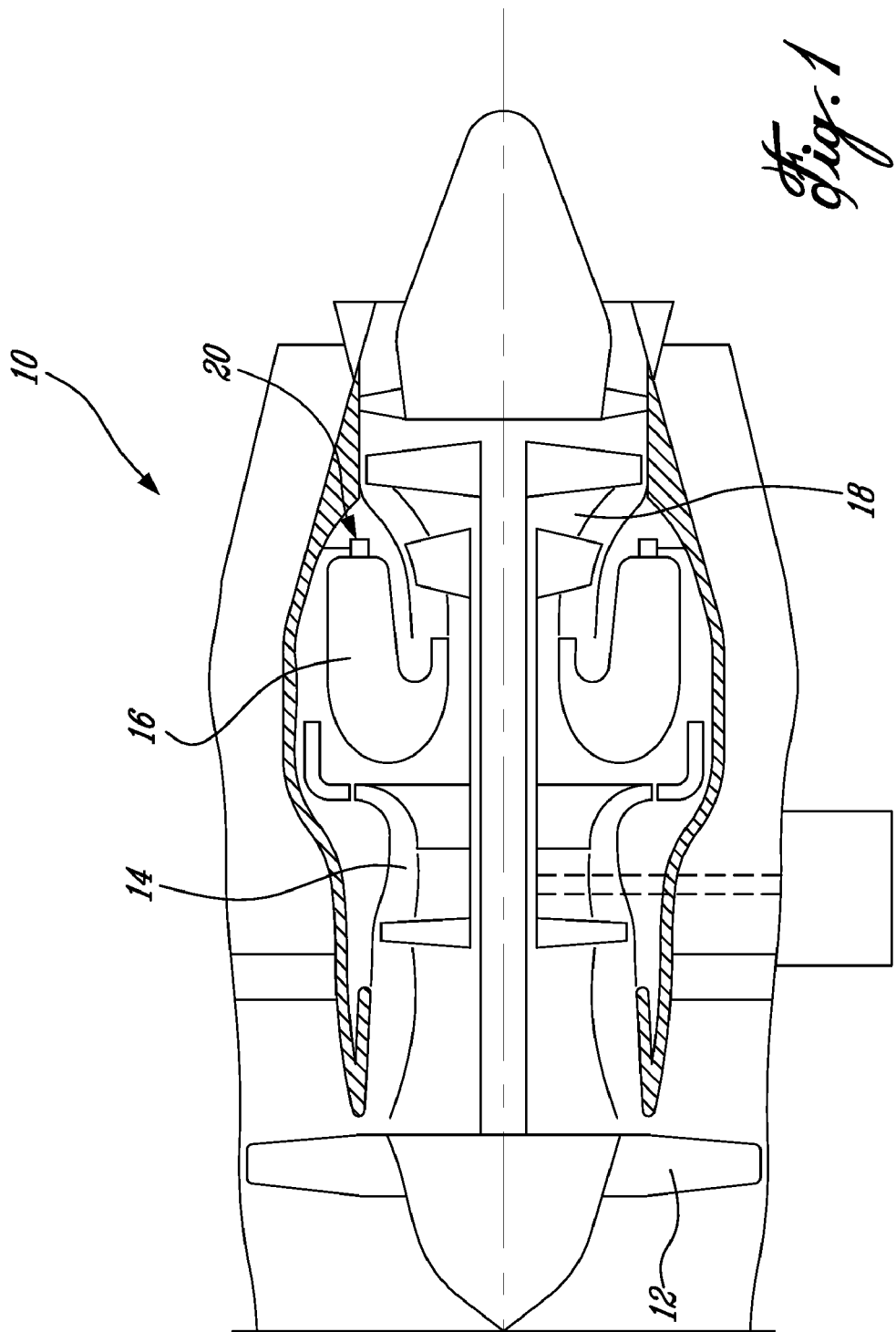
FIG. 1 is a schematic cross-sectional view of a gas turbine engine.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized by a fuel injection system 20, the mixture being subsequently ignited for generating hot combustion gases before passing through a turbine section 18 for extracting energy from the combustion gases.

Figure 2:
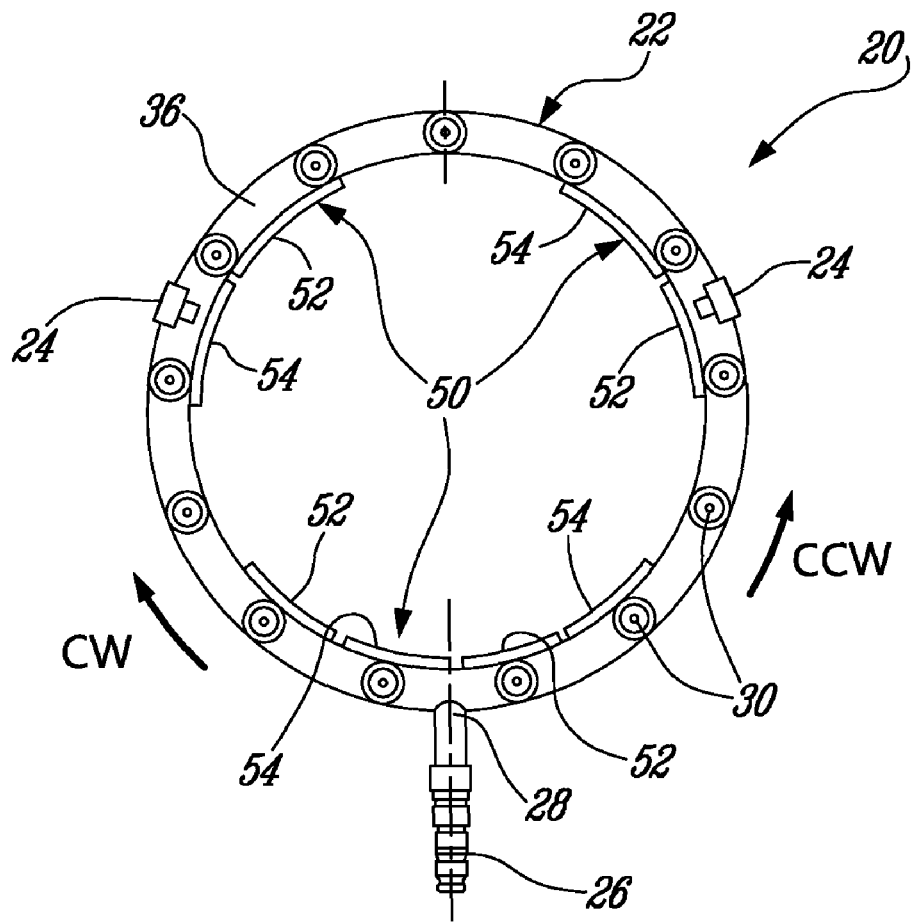
FIG. 2 is a front view of an internal fuel manifold assembly in accordance with a particular aspect of the present invention, which can be used in a gas turbine engine such as that shown in FIG. 1.

Referring to FIG. 2, the fuel injection system 20 comprises at least one fuel conveying member through which fuel flows. In the exemplary embodiment, the fuel injection system 20 includes an annular internal manifold assembly 22 having a ring shape. The fuel manifold assembly 22 is preferably mounted in the combustion section 16 to surrounding support structure via several integral attachment lugs 24 which receive pins (not shown) engaged to the support structure. This provides a mounting mechanism which allows for thermal expansion of the internal manifold at high temperatures.

Figure 3:
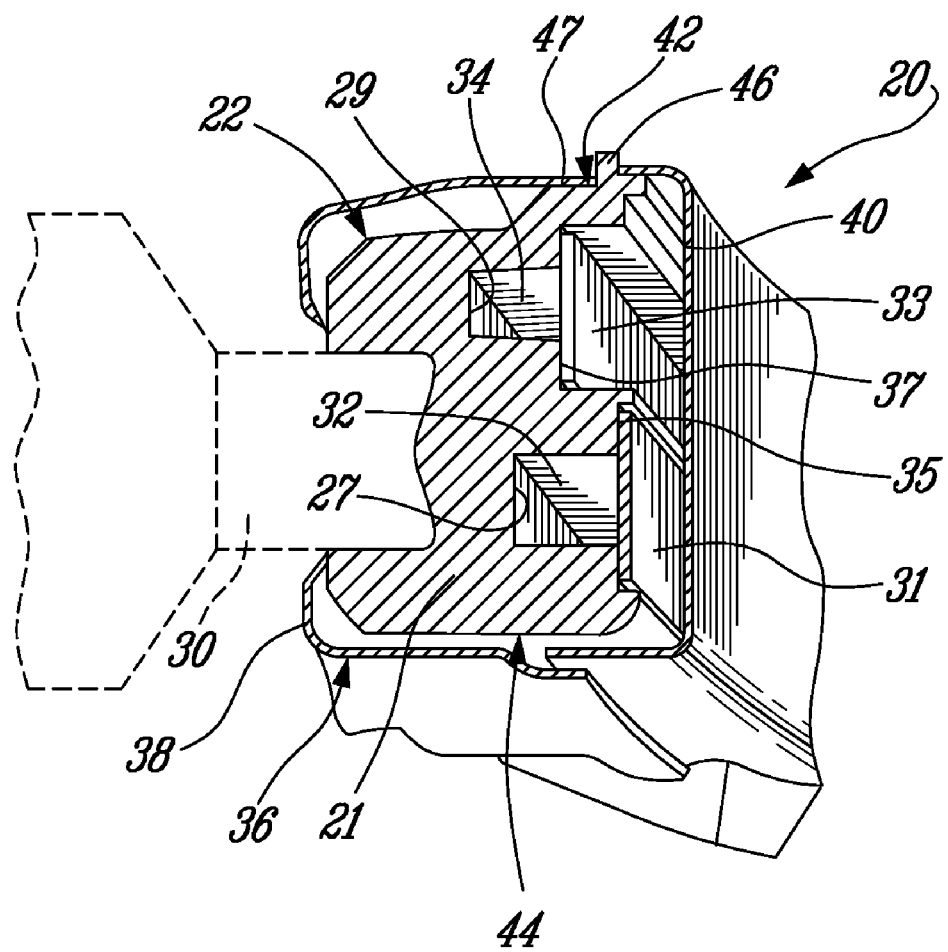
FIG. 3 is a perspective cross-sectional view of the internal fuel manifold assembly of FIG. 2, taken through line 3-3 thereof.

Referring to FIG. 3, the fuel manifold assembly 22 includes a fuel manifold ring 21 defining at least one fuel flow passage therein in fluid flow communication with a plurality of fuel nozzles 30 mounted thereto. A fuel inlet pipe 26 provides fuel to the manifold ring 21, via inlet 28 (see FIG. 2). The fuel nozzles 30 can be directly mounted to the manifold ring 21. In the embodiment shown, primary and secondary fuel channels 27, 29 are defined in the manifold ring 21. Each channel 27, 29 is sealed by a respective sealing member 31, 33, for example an annular ring plate, which is fixed against a shoulder 35, 37 in the respective channel 27, 29 by way of brazing or another fastening/sealing method. Thus, primary and secondary annular fuel conduits 32, 34 are defined, permitting circumferential distribution of a primary and secondary fuel supply provided through the inlet pipe 26 around the manifold ring 21. Referring to FIG. 2, the primary and secondary fuel supplies both split in two upon entering the manifold ring 21 through the fuel inlet 28, and each flow in both a clockwise direction, identified by "CW", and in a counter clockwise direction, identified by "CCW", away from the fuel inlet 28.

Referring to FIG. 3, the manifold assembly 22 comprises a heat shield 36 which at least partially covers and surrounds the manifold ring 21. Preferably, the heat shield 36 covers almost the entire manifold ring 21, such as to protect it from the high temperatures of the combustion section 16 of the engine 10. The heat shield 36 of the fuel manifold assembly 22 is provided as a two-part shield, having a front segment 38 and a rear segment 40 for enclosing the manifold ring 21. The front and rear segments 38, 40 meet each other and/or a joint receiving member on the manifold ring 21 about an inner and outer diameter 42 and 44 thereof. However, in an alternate embodiment the heat shield 36 may be in fact composed of a single component, provide installation thereof around the manifold ring 21 remains possible. In the embodiment shown, the joint receiving member of the fuel manifold ring 21 is in the form of an inner circumferential lip 46 protruding radially inwardly from a circumferential surface 47 on the inner diameter 42 of the manifold ring 21.

The front and rear heat shield segments 38, 40 are in abutting relation with the lip 46 about the inner diameter 42 of the manifold ring 21. The front and rear heat shield segments 38, 40 overlap along the outer diameter 44 of the manifold ring 21. Thus, the front and rear heat shield segments 38, 40 are attached to the manifold ring 21 along the inner diameter 42 and are free to move relative to each other along the outer diameter 44 thereof. As the contact between the heat shield 36 and the manifold ring 21 is limited generally to the lip 46, the conductive heat transfer therebetween is accordingly limited. Further, as the interconnection between the heat shield 36 and manifold ring 21 is limited to a relative confined area, relatively simple manufacturing of the manifold assembly 22 is possible (i.e. the heat shield 36 and the manifold ring 21 are connected in a limited and relatively accessible region of the manifold assembly 22).

Referring to FIGS. 2-4, the heat shield 36 is joined to the manifold ring 21 by a plurality of welded joints 50. The term "welded joint" is used in the present specification and claims in a broad sense to include joints uniting or fusing elements through compression and/or heating (e.g. by a flame, electric arc, laser, ultrasound, electron beam, friction) and/or any other adequate joint producing process, with or without the addition of fusible material like or unlike the elements to be united. As such, the welded joints 50 can be, for example, brazed joints which are generally produced by melting a lower-melting-point material between the elements to form a bond therebetween without melting the elements themselves.

In the embodiment shown, the joints 50 are intermittently disposed about the circumference of the manifold ring 21, and more specifically on the lip 46 along the inner diameter 42, without covering the entire circumference of the manifold ring 21. In a particular embodiment, the configuration of the joints 50 may be as taught by U.S. application Ser. No. 11/466,137 filed Aug. 22, 2006 which is incorporated herein by reference. Such a joint configuration considers both the heat transfer which occurs through the joints 50 and the dynamics of the manifold assembly 22 in response to the location of the joints 50, providing the minimum support required for the heat shield 36 to remain attached to the manifold ring 21 while maintaining the manifold assembly 22 dynamically balanced during engine operation. Alternately, the joints 50 may cooperate to cover the entire circumference of the manifold ring 21.

Referring to FIG. 4, the joints 50 include front segment joints 52 and rear segments joints 54. Notably, the joints 50 are provided as front segment joints 52 and rear segments joints 54 primarily for manufacturability purposes. In the particular embodiment shown, the lip 46 can only accept a single joint 50 at any given location since it is at least partially eaten away during the formation of the joint 50. Hence, attaching both the front and rear segments 38, 40 to the manifold ring 21 at the same location on the lip 46 would entail attaching the two segment joints 52, 54 at least partially to one another, which reduces the effectiveness of the joints 50. Still further, limiting the overall number of the joints 50 is also desirable for manufacturability purposes. In an alternate embodiment, the lip 46 could be designed to simultaneously accept front and rear segment joints 52, 54 at a same location.

Still referring to FIG. 4, each of the heat shield segments 38, 40 has a connection edge 64, 66 which is, at least in part, attached to the lip 46 by the respective segment joint 52, 54. The front heat shield segment 38 includes a stress relieving feature 56 defined along the connection edge 64 thereof, at each end 58 of each front segment joint 52, which in the embodiment shown is in the form of a small hole or notch defined through the front heat shield segment 38. The rear heat shield segment 40 similarly includes a stress relieving feature 60 defined along the connection edge 66 thereof, at each end 62 (only one being shown) of each rear segment joint 54, which in the embodiment shown is also in the form of a small hole or notch defined through the rear heat shield segment 40. As such, the notches 56, 60 are located at opposed ends of joint receiving portions of each heat shield segment 38, 40, i.e. of portions of the heat shield segment 38, 40 which form the joint 50 with the lip 46. The notches 56, 60 are kept small enough so that the exposed surface of the manifold ring 21 through the notches 56, 60 is substantially small, such that the additional heat transfer to the manifold ring 21 through the notches 56, 60 is negligible.

Figure 5A:
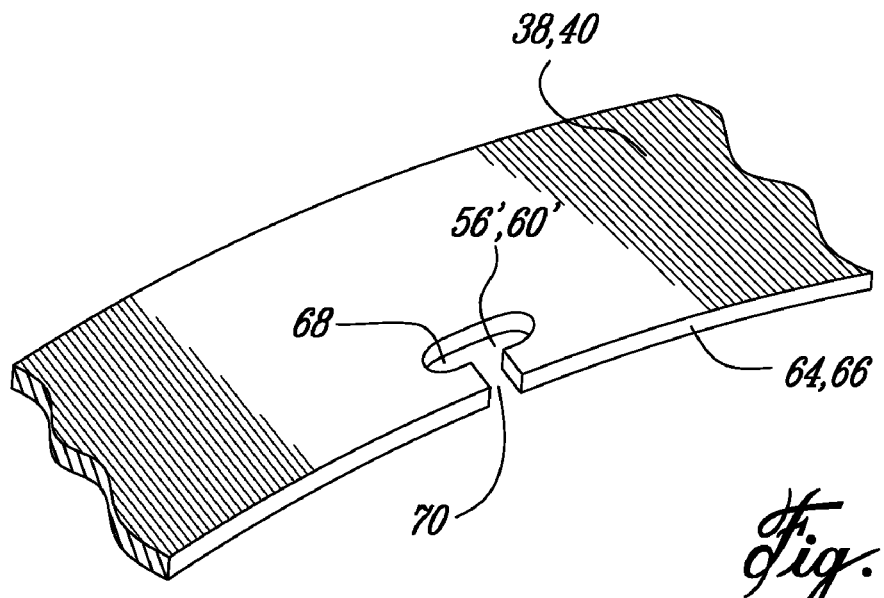
FIGS. 5A and 5B are perspective schematic views of part of a heat shield of the manifold assembly showing alternate embodiments of a stress relieving feature formed thereon.

The notches 56, 60 in the embodiment shown have a semicircular geometry extending from the connection edge 64, 66 of the respective heat shield segment 38, 40. However, it is understood that any adequate alternate notch geometry can be selected. One example of an alternate geometry is shown in FIG. 5A, where the stress relieving feature 56', 60' defined in the rear heat shield segment 38 and/or the front heat shield segment 40 is in the form of a notch defined through the heat shield segment 38, 40 and having an oblong portion 68 located away from the respective connection edge 64, 66 and a rectangular portion 70 extending between the oblong portion 68 and the connection edge 64, 66. Other alternate notch geometries are also possible.

The heat shield segment notches 56, 60, 56', 60' thus act as a stress relieving feature for the heat shield 36 by removing heat shield material where a stress concentration would otherwise occur. The notches 56, 60, 56', 60' provide increased flexibility of the heat shield 36 adjacent the ends 58, 62 of the front and rear segment joints 52, 54. In addition, the notches 56, 60, 56', 60' prevent eventual cracks formed in the heat shield 36 near the ends 58, 62 of the front and rear segment joints 52, 54 from propagating, as they form a discontinuity in the heat shield material where the cracks would otherwise extend.

Figure 5B:
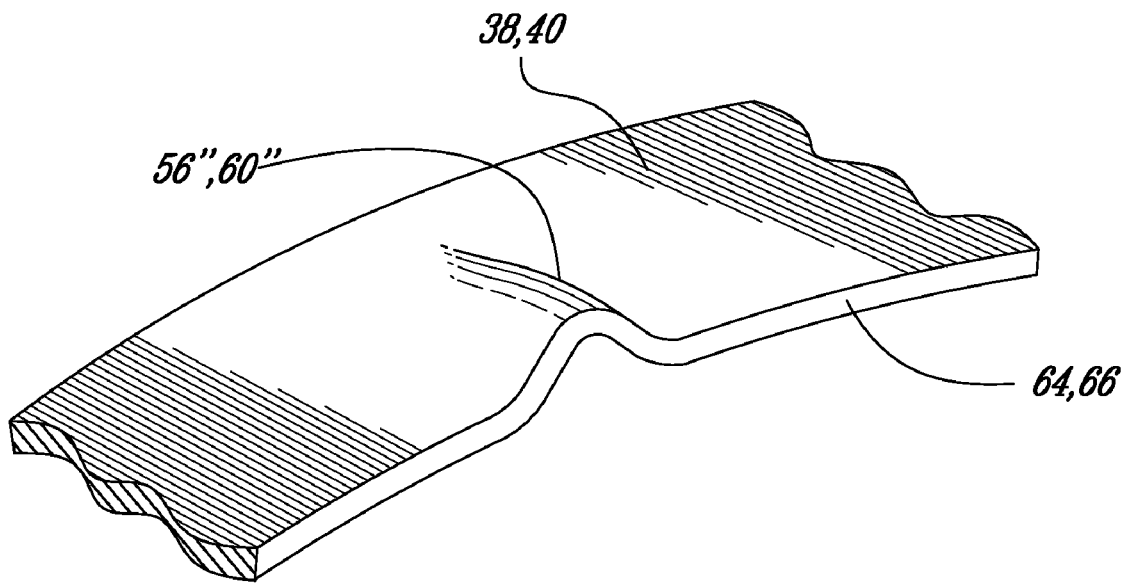

In an alternate embodiment, the stress relieving features are in a form other than notches such as described above. Referring to FIG. 5B, an alternate stress relieving feature 56", 60" is shown for the rear heat shield segment 38 and/or the front heat shield segment 40, in the form of a fold in the shield segment material defined adjacent the respective connection edge 64, 66. The fold 56", 60" provides additional material in the highly stressed area near the joints, thus allowing increased flexing of the corresponding shield segment 38, 40 at that location and reducing the stress herein.

The above description is meant to be exemplary only, and one skilled in the art will recognize that changes may be made to the embodiments described without department from the scope of the invention disclosed. For example, although the front and rear heat shield segments were shown and described as being annular, a plurality of heat shield segments each covering only a circumferential portion of the manifold ring could alternately be used. Alternate stress relieving features can also replace the notches 56, 60, 56', 60' and folds 56", 60" shown. Still other modifications which fall within the scope of the present invention will be apparent to those skilled in the art, in light of a review of this disclosure, and such modifications are intended to fall within the appended claims.

What is claimed is:

1. A fuel injection system for a gas turbine engine, the system comprising:
    a fuel conveying member adapted to circulate fuel therethrough, the fuel conveying member having an outer surface and a circumferentially elongated joint receiving member protruding therefrom; and
    a heat shield substantially covering the fuel conveying member, the heat shield having at least one connection edge extending along the joint receiving member and attached thereto by at least one elongated welded joint, and at least one stress relieving feature defined along the connection edge circumferentially adjacent at least one end of the welded joint; and
    wherein the fuel conveying member is a manifold ring, and the joint receiving member includes a lip protruding from a circumferential surface of the manifold ring.

2. The fuel injection system as defined in claim 1, wherein the heat shield includes first and second heat shield segments cooperating to substantially cover the fuel conveying member, the at least one connection edge including first and second connection edges respectively defined by the first and second heat shield segments.

3. The fuel injection system as defined in claim 2, wherein the fuel conveying member is a manifold ring, the first heat shield segment covering a front portion of the manifold ring and the second heat shield segment covering a rear portion of the manifold ring.

4. The fuel injection system as defined in claim 1, wherein the joint receiving member receives at most one welded joint at any given location thereof.

5. The fuel injection system as defined in claim 1, wherein the at least one stress relieving feature includes a stress relieving feature defined adjacent each end of each welded joint.

6. The fuel injection system as defined in claim 1, wherein the stress relieving feature includes a notch defined through the heat shield along the corresponding one of the at least one connection edge.

7. The fuel injection system as defined in claim 1, wherein the welded joint is a brazed joint.

8. A method of manufacturing a fuel injection system, the method comprising:
    forming a fuel conveying member with a circumferentially elongated joint receiving member extending from a circumferential outer surface thereof, wherein the fuel conveying member is a manifold ring, and the joint receiving member includes a lip protruding from the circumferential outer surface of the manifold ring;
    forming at least one heat shield segment to surround the fuel conveying member;
    forming at least one stress relieving feature in each heat shield segment along a connection edge thereof;
    placing each heat shield segment around the fuel conveying member with the connection edge thereof extending along the joint receiving member; and
    forming at least one welded joint between the connection edge and the joint receiving member, the at least one welded joint extending with at least one end thereof circumferentially adjacent a corresponding one of the at least one stress relieving feature.

9. The method as defined in claim 8, wherein forming the at least one stress relieving feature includes forming at least one notch through each heat shield segment along the connection edge thereof.

10. The method as defined in claim 8, wherein forming the at least one welded joint is performed with each end thereof adjacent the corresponding stress relieving feature.

11. The method as defined in claim 8, wherein forming the at east one welded joint includes forming at least one brazed joint.

* * * * *

UNITED STATES PATENT AND TRADEMARK OFFICE
CERTIFICATE OF CORRECTION

PATENT NO.        : 7,775,047 B2                                          Page 1 of 1
APPLICATION NO.   : 11/534381
DATED             : August 17, 2010
INVENTOR(S)       : Jason Fish and Bhawan B. Patel It is certified that error appears in the above-identified patent and that said Letters Patent is hereby corrected as shown below:

claim 11, column 6, line 26, delete "east" insert --least--

Signed and Sealed this

Nineteenth Day of October, 2010

David J. Kappos
*Director of the United States Patent and Trademark Office*